P. L. A. GIAUQUE.
PACKING DEVICE FOR VALVE RODS OF EXPLOSION ENGINES.
APPLICATION FILED AUG. 28, 1919.

1,348,936.

Patented Aug. 10, 1920.

P. L. A. GIAUQUE.
PACKING DEVICE FOR VALVE RODS OF EXPLOSION ENGINES.
APPLICATION FILED AUG. 28, 1919.
1,348,936.
Patented Aug. 10, 1920.
3 SHEETS—SHEET 2.
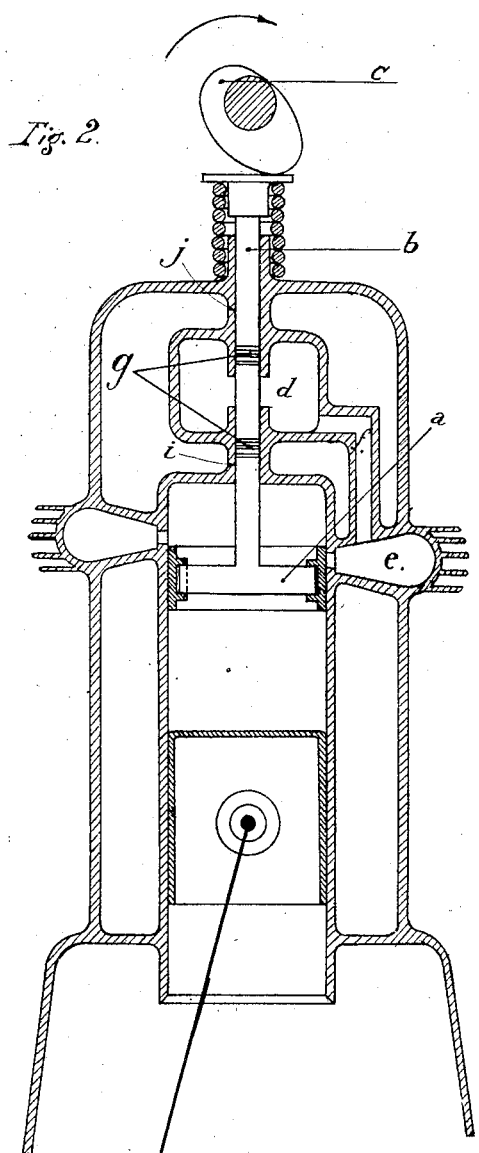
Fig. 2.
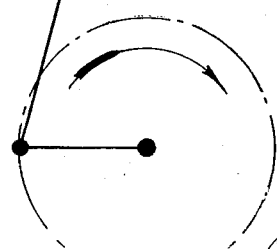
INVENTOR:
Pierre L. A. Giauque
BY Wm Wallace White
ATT'Y.

P. L. A. GIAUQUE.
PACKING DEVICE FOR VALVE RODS OF EXPLOSION ENGINES.
APPLICATION FILED AUG. 28, 1919.
1,348,936.
Patented Aug. 10, 1920.
3 SHEETS—SHEET 3.
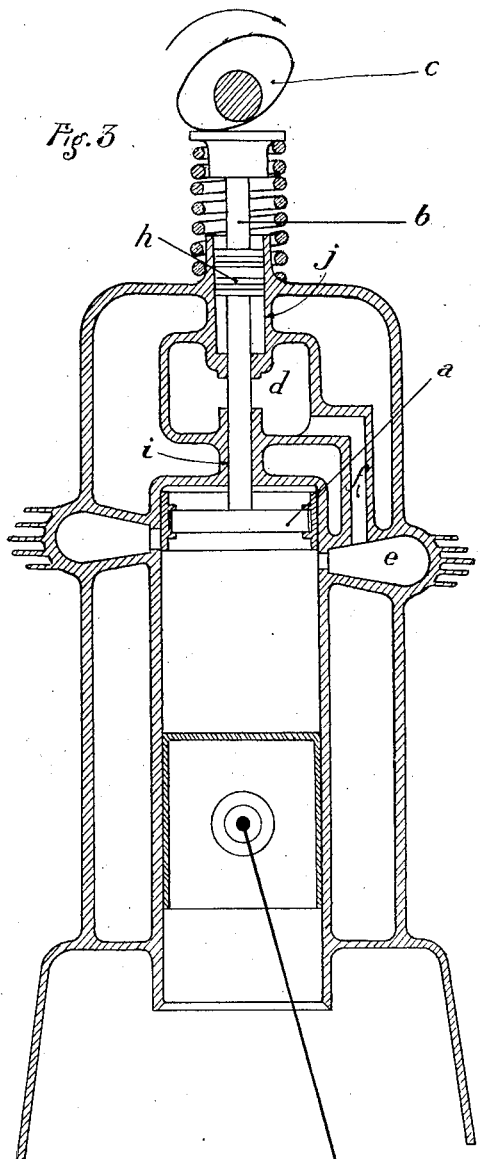
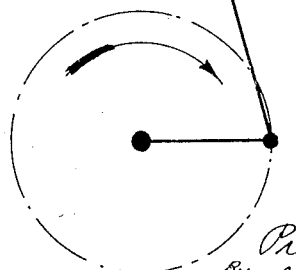
INVENTOR:
Pierre L. A. Giauque
By Wm Wallace White
ATTY.

UNITED STATES PATENT OFFICE.

PIERRE LOUIS ALFRED GIAUQUE, OF LEVELLOIS-PERRET, FRANCE, ASSIGNOR TO SOCIETE ANONYME DES AUTOMOBILES & CYCLES PEUGEOT, OF PARIS, FRANCE.

PACKING DEVICE FOR VALVE-RODS OF EXPLOSION-ENGINES.

1,348,936.   Specification of Letters Patent.   Patented Aug. 10, 1920.

Application filed August 28, 1919. Serial No. 320,355.

*To all whom it may concern:*

Be it known that I, PIERRE LOUIS ALFRED GIAUQUE, citizen of the Republic of Switzerland, residing at 80 Rue Danton, Levellois-Perret, Seine, in the Republic of France, have invented certain new and useful Improvements in Packing Devices for Valve-Rods of Explosion-Engines, of which the following is a specification.

This invention relates to packing means whereby a tight joint is obtained around the operating rod of a distribution valve in internal combustion engines.

In the annexed drawings:

Fig. 2 is a similar section showing the distributing valve in the position it occupies when the exhaust ports are open.

Fig. 3 is a similar section showing the position of parts when admission is open.

Figure 1:
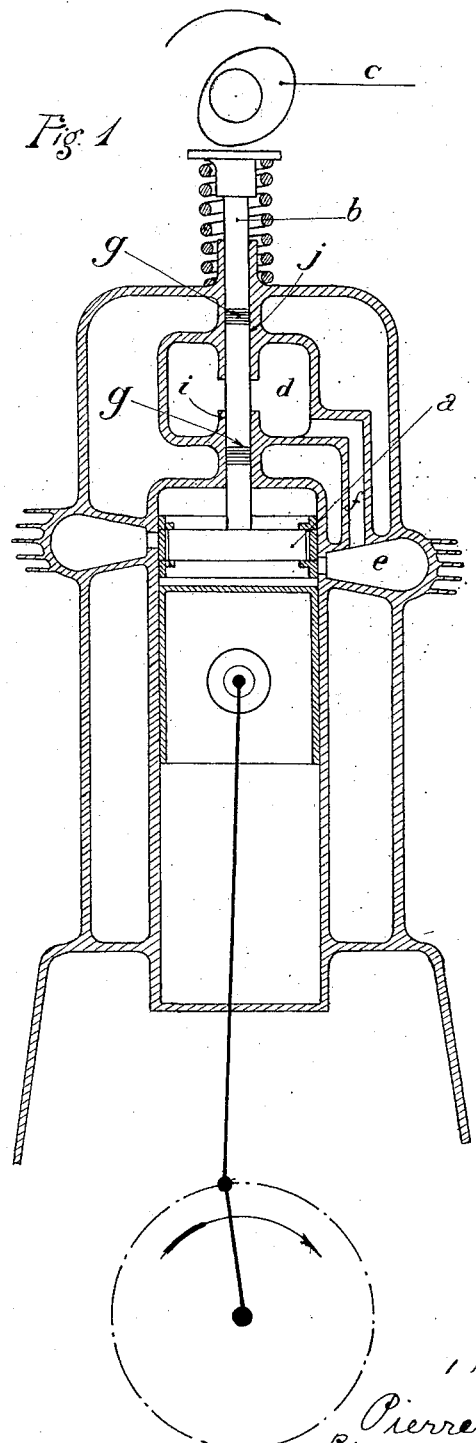
Figure 1 is a longitudinal section of a working cylinder of an internal combustion engine, the distributing valve being shown in the position it occupies at the time of maximum explosion pressure.

The explosion engine shown in the drawing is of a known type. The distributing slide valve $a$ is actuated by the rod $b$. In the example shown, the valve receives a suitable movement for the operation of a four cycle explosion engine through the medium of the cam $c$. Said movement could also be obtained by the combination of two eccentrics, one of which would rotate at the same speed as the engine and the other at half speed, as in well known constructions.

A characteristic feature of the present invention resides in the special means provided for obtaining a tight joint around the valve rod $b$. Said rod is guided as shown in two spaced bushings or sleeves $i$ and $j$ which are shown integral with the cylinder wall. The interval between the bushings $i$ and $j$ is a part of an expansion chamber $d$ of suitable capacity which is permanently in communication with an admission conduit $e$ of the engine through a passage $f$.

When the explosion occurs, the gases may escape through the slight clearance which necessarily exists between the valve rod and the wall of the lower guide or bushing $i$. The escaping gases expand then in the chamber $d$. By this means, any appreciable leakage to the outside is avoided.

As a further means for reducing the leakage, the valve rod may be provided with outer pressure absorbing grooves $g$ (Figs. 1 and 2).

As shown in Fig. 3, the valve rod may also be provided with packing rings $h$ working in the upper guide $j$.

Having now described my invention, what I claim as new and desire to secure by Letters Patent is:

1. The combination of an explosion cylinder, a valve working in said cylinder and having a rod, a guide for said valve rod and means whereby the gases which may escape between the valve rod and the guide are led to the admission conduit of the engine.

2. The combination of an explosion cylinder, a valve working in said cylinder and having a rod, a guide for said valve rod, an expansion chamber in communication with the annular space between the valve rod and the guide and means affording a permanent communication between the expansion chamber and the admission pipe of the engine.

3. The combination of an explosion cylinder, a valve working in said cylinder and having a rod, two axially spaced guides for said rod, an expansion chamber between said spaced guides and means affording a permanent communication between the expansion chamber and the admission conduit of the engine.

4. The combination of an explosion cylinder, a valve working in said cylinder and having a rod, two axially spaced guides for said rod, an expansion chamber between said spaced guides and means affording a permanent communication between the expansion chamber and the admission conduit of the engine, the valve rod being provided with packing means in its part working in the guide which is farthest from the explosion cylinder.

5. The combination of an explosion cylinder, a valve working in said cylinder and having a rod, two axially spaced guides for said rod, an expansion chamber between said spaced guides and means affording a permanent communication between the expansion chamber and the admission conduit of the engine, the guided parts of the valve rod being provided with annular pressure absorbing grooves.

In testimony whereof I have affixed my signature in presence of a witness.

PIERRE LOUIS ALFRED GIAUQUE.

Witness:
CHAS. P. PRESSLY.